July 6, 1965  R. EMERIAT  3,193,414
PROCESS FOR MANUFACTURING A GAS-PERMEABLE AND
LIQUID-PROOF POROUS ELECTRODE
Filed Nov. 14, 1960
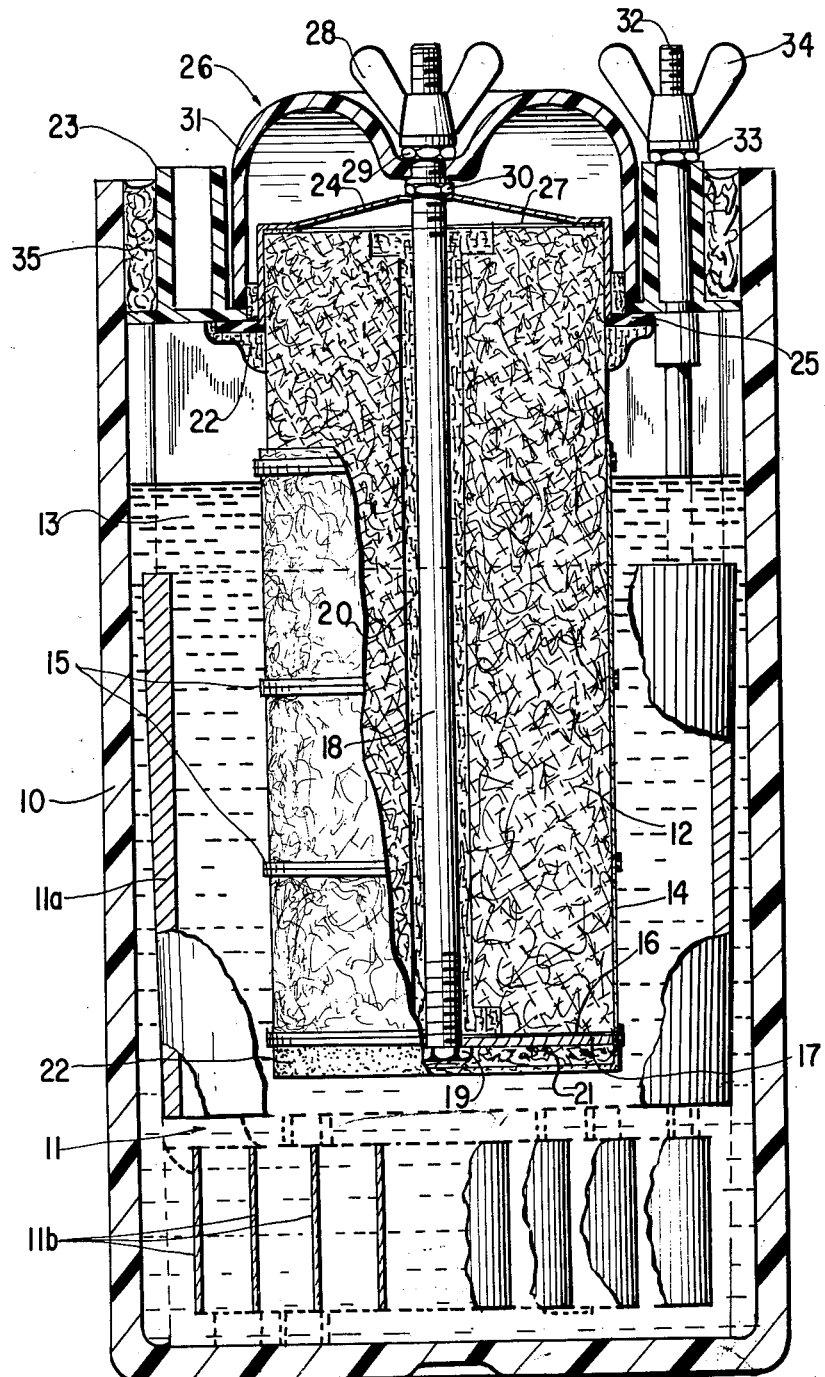
INVENTOR
RAYMOND EMERIAT
BY
ATTORNEYS 3,193,414
PROCESS FOR MANUFACTURING A GAS-PERMEABLE AND LIQUID-PROOF POROUS ELECTRODE
Raymond Emeriat, Paris, France, assignor to Societe des Accumulateurs Fixes et de Traction (Societe Anonyme), Romainville, France, a company of France
Filed Nov. 14, 1960, Ser. No. 69,137
Claims priority, application France, Nov. 17, 1959, 810,421
1 Claim. (Cl. 136—122)

The present invention relates to gas-porous and moisture-proof electrodes which can be used in air-depolarized cells, in fuel cells as electrodes having eventually a catalytic action, and in some kinds of gas-tight storage cells as auxiliary or even main electrodes.

Such a porous electrode is constituted by an agglomerate of conductive particles of carbon, metals such as nickel, silver, cadmium, etc. or of a mixture of carbon and metal; particles of a catalytic agent such as palladium may eventually be added to them. The agglomerate is obtained by means of a binding agent which has in addition to the function of giving mechanical strength to the electrode, a function of limiting the maximum quantity of electrolytic liquid which can be absorbed in time by the agglomerate so that the latter may retain its gas-porosity and thus insure the normal operation of the electrode during a long period of time.

It is already known to use paraffin, vaseline oil, silicates, pitch, etc. either alone or mixed, as liquid-proof binders. It has frequently been observed that the electrodes obtained with such binders do not securely insure the correct functioning and long life of the cells where they are used, either because of a manufacturing mistake, or because of a discharge at too high a rate, or because of use at too low a temperature.

An object of the present invention is to prevent these drawbacks by the use of a new binder, including the means of blending this binder in the agglomerate so that a uniform production of long lived electrodes is insured.

Another object of the present invention is a gas-permeable and liquid-proof porous electrode of the kind previously specified, characterized in that the binder is a synthetic plastic material which is gas-permeable when in the shape of a thin porous layer, such as polystyrene.

I have observed that there is an optimum value for the amount of binder in the dry electrode, which is such that the cohesion, the conductivity and the porosity of the electrode are highest for this value. In the air-depolarized cells having an alkaline electrolyte and with the polystyrene as a binder, this amount should be about 11% in weight of the dry agglomerate.

In a general way, in order to realize thin porous layers of a binder in the agglomerate, the binder must be used in a solution and the selected plastic material must meet the following requirements:

Gas must diffuse through thin layers of this plastic material;

This material must not substantially absorb water so that the thin porous layers are impervious to liquid containing water;

The solvent used must be practically non-volatile at room temperature but must be able to be completely evaporated at not too high a temperature (not higher than 100° C.) so that the amount of plastic material can be exactly determined.

I have observed that polystyrene used with trichlorethylene as solvent readily meets these requirements. Trichlorethylene boils at 87° C.

The application of polystyrene as a binder will be explained in detail in the following description in the case of the production of an alkaline air-depolarized cell, and to this end, the annexed drawing will be referred to; the only figure being a sectional view of an embodiment of an alkaline air-depolarized cell having a positive electrode according to the invention.

As shown in the drawing, 10 is the molded material container, 11 is the negative electrode made of two parts 11a and 11b and 12 is the agglomerate used as a positive electrode.

The negative electrode 11 is a soluble electrode, e.g., made of zinc; during the cell operation, this electrode on which hydroxyl ions are discharged is changed into zinc oxide and hydroxide, which dissolve in the alkaline electrolyte as zincate. In order to prevent the zinc electrode from becoming passive, which hinders the action of the ions upon this electrode, and brings about the phenomenon of inversion of the electrodes when the cell is one of a battery, various solutions are used, the principle of which is the following: the electrode is not in the same polarization state in every part and the less polarized parts depolarize the others. Sometimes an auxiliary electrode is used, sometimes the electrode has such a shape that the distances covered by the ions between the positive and the negative electrodes are of different lengths. The latter solution is shown on the figure:

The main cylindrical electrode 11a, the thickness of which decreases downwardly, is connected to a spiral 11b placed upon the bottom of the container 10.

The electrolyte 13 may be a sodium hydroxide solution having a specific gravity of 1.17 or 1.20; for use at low temperatures the sodium hydroxide solution has a specific gravity of 1.24. The electrolyte is immobilized by arrowroot.

The positive electrode agglomerate 12 is wrapped in a separator 14. This separator, for example, may be a non-woven fabric of fibers made of an acrylonitrile-vinyl-chloride copolymer known by the trade name of "Dynel." The agglomerate 12 emerges above the electrolyte level by about one-third of its height and the separator maintained against the agglomerate 12 by insulating rubber rings 15 sticks out of the electrolyte only very little.

At the lower part, the agglomerate 12 is covered by a coating 16 of conductive plastic material (e.g. polyisobutylene made conductive by the addition of carbon) upon which is applied a compressing disc 17 made of nickel plated steel; this disc bears the axial threaded rod 18 also made of nickel plated steel, by means of a nut 19 made of the same material. The threaded rod 18 goes through the agglomerate from bottom to top and sticks out by several centimeters in order to be used as positive terminal.

The rod 18 is centered in the agglomerate and electrically united to it by the means of a paraffin layer 20 which has been made conductive.

The disc or plate 17 is covered by a pitch layer 21, the said layer being coated by a paraffin film 22.

23 is the cover of the cell, made of a molded material and 24 is the nickel plated steel compressing collar of the positive electrode; the collar which is provided with holes is mechanically connected to the cover, through a rubber protecting ring 25, by the means of an arch-like part 26. A disc-shaped coating film 27 of conductive plastic material (e.g. polyisobutylene made conductive by the addition of carbon) is inserted between the upper face of the agglomerate and the flange of the collar. By screwing the fly-nut 28 above the two hexagonal nuts 29 and 30 between which the arch 26 is threaded on the rod 18, the electrode collar 24 closely engages the cover 23 and the whole is mechanically strong.

Protective sheaths made of vinyl resin are referred to by the number 31.

32 is the threaded rod extending from the negative electrode 11a which is used as a negative terminal; it is also provided with a hexagonal nut 33 and a fly-nut 34.

The cover is compressed by means of the nuts 29 and 33 and is sealed by a pitch layer 35.

The manufacture of a depolarizer electrode agglomerate such as 12 may be accomplished in the following way: a mixture of 1 kg. of finely divided coal, quality Elorit Standard, with 200 g. of soot, is prepared by treating in a mixer for about half an hour. 1360 cm.³ of a solution obtained by dissolving 100 g. of polystyrene in one liter of trichloroethylene are added to this mixture, and the whole is mixed for about a quarter of an hour, then the paste thus obtained is strained through a 2 mm. mesh screen so that it is quite uniform.

750 g. of this mixture are weighted to make up an electrode and introduced into a cylindrical mold, the movable bottom of which bears a needle, having a diameter which may be about 12 mm., and extending to the top of the mold. The paste inserted into the mold does not quite extend to the top. It is compressed by means of a plunger until it has the final height of the desired electrode and is then ejected by means of the movable bottom.

The molded agglomerate is then dried at 95–100° C. in a drying oven for about 20 hours. The evaporation of the trichlorethylene therefrom gives a uniform porosity to the mass. The dry agglomerate has then a diameter of 68 mm. and a height of 165 mm.

After drying, the coating 16 and the plate 17, bearing the threaded rod 18, are applied to the lower part of the agglomerte. The rod 18 has a diameter of 6 mm. and is perpendicular to the plate, so that it constitutes the axis of the electrode. It must therefore be well centered in the middle of the hollow part of the electrode, which has formed by the means of the needle in the compression mold.

A 50–50 mixture of paraffin and graphite maintained between 110° and 120° so that it is liquid enough is then poured into the annular space defined around the threaded rod 18. The paraffin diffuses in the electrode only to a very small depth.

When the conductive paraffin mixture is cooled, the nickel plated steel collar 24 is applied to the upper part of the porous electrode. The threaded rod 18 goes through this collar which is compressed against the upper part of the agglomerate by the means of a nut 30.

The nickel plated disc 17 situated against the lower part of the agglomerate is then coated with pitch 21 by dipping.

The outer skin of the agglomerate is scraped off with emery cloth then this agglomerate is soaked preferably in a potassium hydroxide solution of 1.20 specific gravity for about 40 hours. The increase of weight obtained by this soaking is between 8 and 12 grams. The improved performance of the electrodes according to the present invention is brought out during this soaking operation. If the soaking time were increased even to 2 or 3 weeks, the amount of electrolyte absorbed would remain limited to 12 g., which means that it does not reach a dangerous value which would completely flood the electrode with the electrolyte. Thus, there is a practically constant absorption of the electrolyte which does not depend upon the soaking time, which is very important for realizing numerous zones where three phases coexist (gaseous phase constituted by oxygen, liquid phase constituted by the electrolyte and solid phase constituted, e.g., by the carbon).

This improvement is evident when the porous electrodes used up to now are examined; these electrodes used to absorb an average of 15 g. of electrolyte even after soaking only 17 hours. If the soaking time was increased, the amount of electrolyte would still go up to such values that the correct operation of the positive electrode was hindered. This increase of absorption would take place, though at a lesser rate, in the finished cells, where the positive electrode would be in contact with a more viscous alkaline solution, and at last after a sufficiently long time on the shelf or in use, the positive electrode could stop operating because it was completely flooded with electrolyte.

After the partial impregnation, the agglomerate 12 according to the invention is wrapped in the separator 14 and care is taken to leave about 2 cm. between the top of the separator and the lower rim of the collar 24. Thus, the cell electrolyte absorbed by the copolymer fabric of the separator is prevented from creeping by capillarity to the upper part of the agglomerate which it would then risk flooding. It is quite essential not to have any liquid on the upper part of the electrode.

The four rubber rings 15 are put in place in order to maintain the separator around the agglomerate and the positive electrode is then ready to be put into the cell.

This last operation is accomplished in the following way: the electrolyte which may be a caustic soda solution containing small amounts of sodium chloride and arrow-root used as a thickener is poured into the container already provided with its zinc negative electrode.

The thickener is added to the warm electrolytic solution which is poured in this state and will be immobilized on cooling.

The positive electrode is mounted separately on the cell cover and the cell cover provided with the positive electrode is fastened on the container by already known means and in the manner described above.

The following data are characteristic of a cell provided with the positive electrode according to the invention:

| | |
|---|---|
| Open circuit E.M.F. _____v__ | 1.46 |
| Voltage on a 5 ohms load _____v__ | 1.40 |
| Short-circuiting current _____A__ | 8 to 10 |

The improved characteristics obtained with the porous electrodes according to the invention may be thus explained: these electrodes must essentially bring about first the atomization, then the ionization of a gas, principally oxygen, but in some instances hydrogen. These electrodes, made of very divided conductive particles, are endowed with this ionizing power when they are at the same time in contact with a gaseous atmosphere and the electrolyte; this threefold frontier between gas, liquid and solid, plays an essential part and it is important to increase its area.

This behavior which has been mentioned above in the case of alkaline air-depolarized cells is confirmed in the other possible uses of these porous electrodes, such as:

Various electrochemical generators (air-depolarized cells with a salt electrolyte, such as ammonium chloride), open or gastight storage cells;

Catalysts, more specifically in the heterogeneous catalyst.

But it is particularly advantageous to use these electrodes in fuel cells; this by reason of the vast area of the threefold frontier between gas, liquid and solid, which gives a high ionizing power, an essential factor to the correct operation of these fuel cells.

It has been said above that the most suitable percentage in weight of binder in the case of an alkaline air-depolarized cell was about 11% of the weight of the dry agglomerate; but in a general manner, for all the applications hereabove mentioned, this value is not exclusive and may vary in the range of from 7 to 15%.

Although specific embodiments of the invention have been disclosed variations within the scope of the appended claim are possible and are contemplated. There is no intention of limitation to the exact disclosure herein made.

What is claimed is:

A process for manufacturing a porous electrode comprising providing a finely divided mixture of carbon and metal particles, adding a solution of polystyrene in trichloroethylene to this mixture to obtain a paste in which the polystyrene is present in the amount of from approximately 7% to approximately 15% of the weight of the particles, straining this paste, molding the strained paste into a body of desired shape, then drying the shaped body at a temperature of from 95°–100° C. for about 20 hours to evaporate the trichloroethylene therefrom and provide a uniformly deposited, thin coating layer on said particles binding the latter together so as to provide uniform pore size in the dried shaped body and in which the particles are coated with a thin, porous, gas-permeable layer of polystyrene.

References Cited by the Examiner

UNITED STATES PATENTS

| | | | |
|---|---|---|---|
| 2,207,734 | 7/40 | Heise | 136—136 |
| 2,641,623 | 6/53 | Winckler et al. | |
| 2,824,165 | 2/58 | Marsal | 136—122 |
| 2,914,596 | 11/59 | Gorin et al. | 136—120 |

FOREIGN PATENTS

| | | |
|---|---|---|
| 576,578 | 5/59 | Canada. |
| 1,035,227 | 10/57 | Germany. |
| 106,116 | 12/42 | Sweden. |

OTHER REFERENCES

Schmidt et al.: Principles of High-Polymer Theory and Practice, published by McGraw-Hill (N.Y.C.), 1948 (pages 704 and 705 are relied on).

JOHN H. MACK, *Primary Examiner.*

JOHN R. SPECK, *Examiner.*

UNITED STATES PATENT OFFICE
CERTIFICATE OF CORRECTION

Patent No. 3,193,414 July 6, 1965

Raymond Emeriat

It is hereby certified that error appears in the above numbered patent requiring correction and that the said Letters Patent should read as corrected below.

Column 3, line 32, after "has" insert -- been --; column 4, lines 49 and 50, for "catalyst" read -- catalysis --.

Signed and sealed this 30th day of November 1965.

(SEAL)
Attest:

ERNEST W. SWIDER
Attesting Officer

EDWARD J. BRENNER
Commissioner of Patents